(12) United States Patent
Kuno

(10) Patent No.: US 12,276,224 B2
(45) Date of Patent: Apr. 15, 2025

(54) COOLING STRUCTURE FOR RADIAL TURBINE

(71) Applicant: HONDA MOTOR CO., LTD., Tokyo (JP)

(72) Inventor: Naoki Kuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/610,437

(22) Filed: Mar. 20, 2024

(65) Prior Publication Data

US 2024/0318591 A1    Sep. 26, 2024

(30) Foreign Application Priority Data

Mar. 23, 2023  (JP) ................. 2023-046172

(51) Int. Cl.
| | | |
|---|---|---|
| *F02C 3/05* | (2006.01) | |
| *F02C 3/06* | (2006.01) | |
| *F02C 7/18* | (2006.01) | |
| *F23R 3/28* | (2006.01) | |

(52) U.S. Cl.
CPC ............ *F02C 3/05* (2013.01); *F02C 3/062* (2013.01); *F02C 7/18* (2013.01); *F23R 3/286* (2013.01)

(58) Field of Classification Search
CPC .............. F02C 3/05; F02C 3/062; F02C 7/18
See application file for complete search history.

(56) References Cited

U.S. PATENT DOCUMENTS

| | | | | |
|---|---|---|---|---|
| 3,266,250 A | * | 8/1966 | Smith ................. | F23R 3/42 |
| | | | | 60/751 |
| 3,285,006 A | * | 11/1966 | Freeman .............. | F23R 3/52 |
| | | | | 60/751 |
| 4,821,506 A | * | 4/1989 | Rodgers .............. | F02C 9/20 |
| | | | | 60/793 |
| 4,923,370 A | * | 5/1990 | Larson ............... | F01D 5/043 |
| | | | | 416/185 |
| 5,101,620 A | * | 4/1992 | Shekleton ............ | F01D 9/02 |
| | | | | 60/804 |
| 5,105,616 A | * | 4/1992 | Bornemisza .......... | F04D 25/04 |
| | | | | 60/726 |
| 5,150,570 A | * | 9/1992 | Shekleton ............ | F23R 3/045 |
| | | | | 60/738 |
| 5,174,108 A | * | 12/1992 | Shekleton ............ | F23R 3/52 |
| | | | | 60/804 |
| 11,619,170 B1 | * | 4/2023 | Dierksmeier ......... | F02C 7/185 |
| | | | | 60/806 |
| 2013/0280036 A1 | * | 10/2013 | Jan .................. | F01D 5/088 |
| | | | | 415/66 |
| 2017/0254209 A1 | * | 9/2017 | Smoke ............... | F01D 5/046 |
| 2017/0298951 A1 | * | 10/2017 | Itoh ................. | F04D 29/30 |
| 2023/0313694 A1 | * | 10/2023 | Kuno ................. | F01D 9/041 |
| | | | | 415/191 |

FOREIGN PATENT DOCUMENTS

JP           6672827 B2     3/2020

\* cited by examiner

*Primary Examiner* — William H Rodriguez

(74) *Attorney, Agent, or Firm* — Rankin, Hill & Clark LLP

(57) ABSTRACT

A cooling structure for a radial turbine is equipped with a partition wall arranged between a compressor and the radial turbine, and a through hole formed in the partition wall supplying a part of air compressed by the compressor to the rear surface of the radial turbine as cooling air. The through hole is inclined in a rotational direction of the radial turbine in the range of 40° to 80° with respect to a rotation axis of the radial turbine.

6 Claims, 9 Drawing Sheets

COOLING STRUCTURE FOR RADIAL TURBINE

CROSS-REFERENCE TO RELATED APPLICATIONS

This application is based upon and claims the benefit of priority from Japanese Patent Application No. 2023-046172 filed on Mar. 23, 2023, the contents of which are incorporated herein by reference.

BACKGROUND OF THE INVENTION

Field of the Invention

The present invention relates to a cooling structure for a radial turbine.

Description of the Related Art

In a radial turbine, the higher the temperature of combustion gas introduced into the radial turbine is, the more turbine performance is improved, though thermal stress increases as the temperature of the combustion gas becomes higher. Conventionally, as one means for reducing the thermal stress, notches are each provided between blades in the outer circumferential portion of a radial turbine (scallop portion). However, the turbine performance is deteriorated when the notches are provided. Another means for reducing the thermal stress is to provide a flow path for cooling in a back plate of the radial turbine. However, when the flow path for cooling is provided inside the back plate, the thickness of the back plate is increased, and the stress acting on the central portion of the radial turbine is increased. Therefore, it is impossible to cope with high rotation. In addition, when the flow path for cooling is provided inside the back plate, it is difficult to improve the performance of the turbine due to the restriction of the blade shape of the radial turbine.

SUMMARY OF THE INVENTION

JP 6672827 B2 discloses a structure in which a part of air compressed by a compressor is supplied toward the rear surface of a radial turbine. However, it is unknown whether the radial turbine can be effectively cooled by the structure disclosed in JP 6672827 B2. There has been a demand to provide a cooling structure for a radial turbine that can effectively cool the radial turbine.

The present invention has the object of solving the aforementioned problem.

In a cooling structure for a radial turbine in a rotating machine according to an aspect of the present invention, the rotating machine includes a compressor configured to compress air and the radial turbine rotationally driven by combustion gas. The cooling structure includes a partition wall disposed between the compressor and the radial turbine and separating a region where the compressor is disposed and a region where the radial turbine is disposed, and a through hole provided in the partition wall and through which a part of the air compressed by the compressor is supplied to a rear surface of the radial turbine as a cooling air, wherein the through hole is inclined in a rotational direction of the radial turbine in a range of 40° to 80° with respect to a rotation axis of the radial turbine.

According to the present invention, the through hole for blowing out the cooling air toward the rear surface of the radial turbine is inclined in the rotational direction of the radial turbine at an angle of 40° or more with respect to the rotation axis of the radial turbine. Thus, the relative velocity of the cooling air with respect to the radial turbine during rotation can be reduced. In accordance with this feature, the relative total temperature of the cooling air with respect to the radial turbine can be reduced. Accordingly, it is possible to secure the cooling capacity of the cooling structure without providing a large notch in the outer circumferential portion of the radial turbine or providing a structure of flow path for cooling in the back plate of the radial turbine. That is, it is possible to cool the radial turbine effectively. The through hole is inclined in the rotational direction of the radial turbine at an angle of 80° or less with respect to the rotation axis of the radial turbine. Thus, the through hole can be formed by boring while ensuring the cooling capacity.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
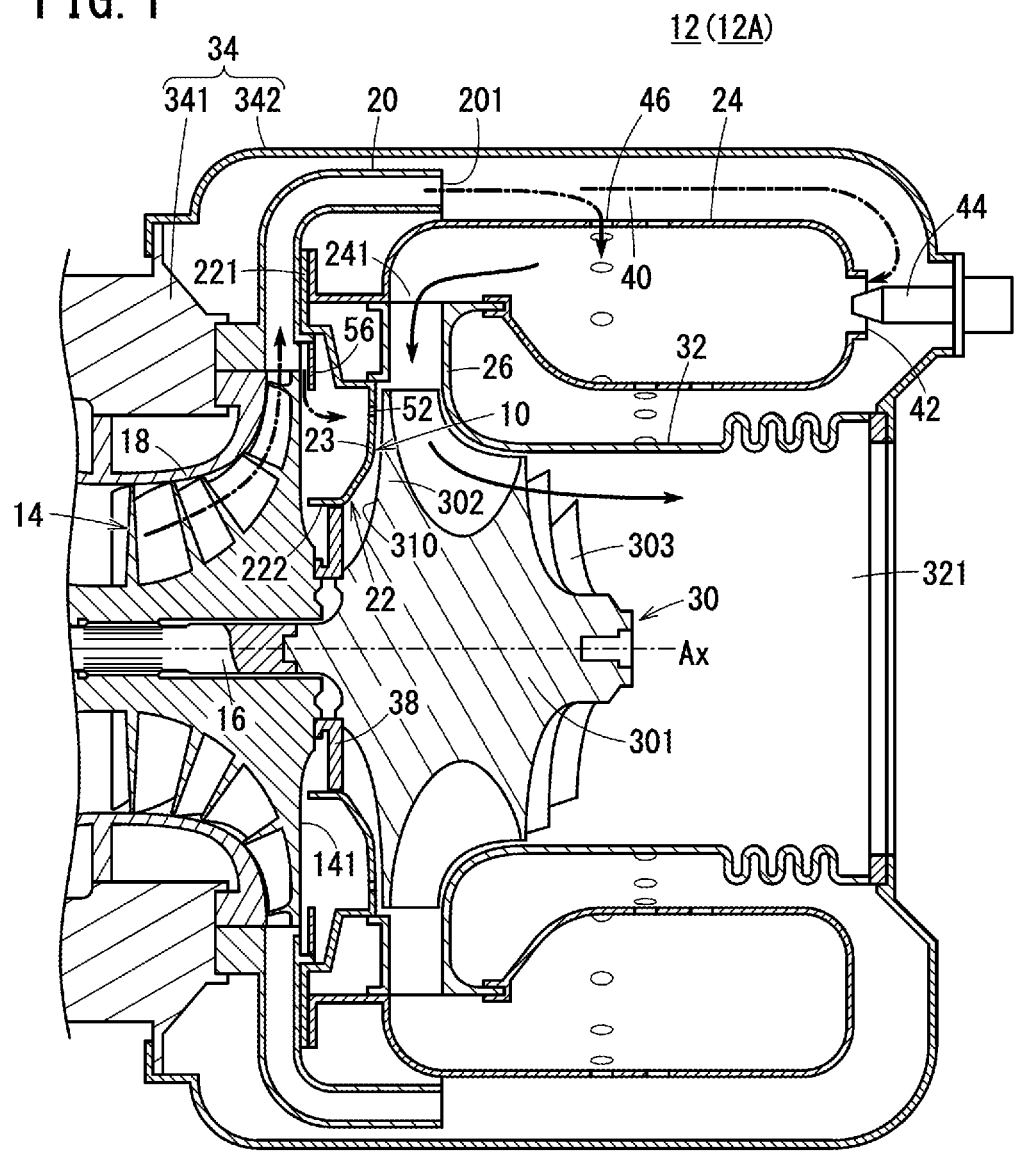
FIG. 1 is a schematic view of a rotating machine including a cooling structure for a radial turbine according to an embodiment of the present invention.

As shown in FIG. 1, a cooling structure 10 for a radial turbine 30 according to an embodiment of the present invention is provided in a rotating machine 12. The rotating machine 12 includes a compressor 14 for compressing air and the radial turbine 30 rotationally driven by combustion gas. The rotating machine 12 shown in FIG. 1 is configured as a gas turbine 12A, and therefore further includes a combustor 24. The rotating machine 12 will be described below with reference to the gas turbine 12A. The rotating machine 12 to which the cooling structure 10 is applied is not limited to the gas turbine 12A. The rotating machine 12 may be, for example, a turbocharger.

The gas turbine 12A includes the compressor 14 (compressor wheel), a shaft 16, a shroud case 18, a diffuser 20, a partition plate 22, the combustor 24, a turbine nozzle 26, the radial turbine 30, a gas exhaust member 32, and a housing 34. The above-mentioned parts of the gas turbine 12A are made of a heat-resistant metal material.

The compressor 14 is arranged inside the housing 34. Specifically, the annular shroud case 18 is arranged inside the housing 34 and surrounds the compressor 14. The housing 34 has a first housing 341 and a second housing 342, and the shroud case 18 is fixed to the first housing 341. The compressor 14 is a centrifugal impeller that draws air from an axial direction into a space formed between the compressor 14 and the shroud case 18 and compresses the air while sending it radially outward.

The compressor 14 is coupled to the radial turbine 30 via the shaft 16. The compressor 14, the shaft 16, and the radial turbine 30 rotate integrally about a rotation axis Ax. Hereinafter, the rotation axis Ax is also referred to as the "rotation axis Ax of the radial turbine 30". The rotation axis Ax of the radial turbine 30 is also an axis of the gas turbine 12A.

The diffuser 20 is a hollow body. The diffuser 20 is fixed to the first housing 341 together with the shroud case 18. The diffuser 20 is arranged in the interior of the second housing 342, in a manner so as to surround one portion of the shroud case 18, one portion of the compressor 14, the partition plate 22, and the radial turbine 30. The diffuser 20 has an outlet 201 opened in the axial direction. The diffuser 20 causes compressed air generated by the compressor 14 to flow therein and to be sent to the combustor 24.

The partition plate 22 is an annular hollow body. The partition plate 22 is a non-rotating portion provided between the compressor 14 and the radial turbine 30. An outer circumferential portion of the partition plate 22 is fixed to the diffuser 20. The partition plate 22 is disposed between a rear surface 141 of the compressor 14 and a rear surface 310 of the radial turbine 30. The partition plate 22 has a partition wall 23 that separates a region where the compressor 14 is disposed and a region where the radial turbine 30 is disposed. The partition wall 23 is a portion between an outer circumferential portion 221 and an inner circumferential portion 222 of the partition plate 22, and faces the rear surface 310 of the radial turbine 30.

An annular seal ring 38 is disposed between the compressor 14 and the radial turbine 30 and rotates integrally with the compressor 14 and the radial turbine 30. The seal ring 38 is disposed inside the partition plate 22 to face the inner circumferential portion 222 of the partition plate 22.

The combustor 24 is disposed inside the second housing 342 and is fixed to the diffuser 20 together with the partition plate 22. The combustor 24 surrounds the turbine nozzle 26, the radial turbine 30 and the gas exhaust member 32.

An annular shaped gas flow passage 40 is formed between an inner circumferential surface of the second housing 342 and the combustor 24. As indicated by the one-dot-dashed arrows, the gas flow passage 40 supplies the compressed air that is introduced from the diffuser 20 to the combustor 24. An introduction port 42 for introducing the compressed air is formed in the combustor 24. A fuel supply nozzle 44 is fixed to the second housing 342. The fuel supply nozzle 44 is positioned so as to enter into the introduction port 42 of the combustor 24. The fuel supply nozzle 44 supplies fuel to the combustor 24.

A plurality of relay holes 46 are formed in the combustor 24. The combustor 24 mixes and causes the fuel supplied from the fuel supply nozzle 44 and the compressed air to undergo combustion, thereby generating a high temperature combustion gas. The combustion gas is discharged to the turbine nozzle 26 via an exhaust port 241 that is formed in the combustor 24.

The turbine nozzle 26 is arranged in the interior of the second housing 342 so as to face toward the exhaust port 241 of the combustor 24. The turbine nozzle 26 is an annular shaped member that surrounds the radial turbine 30. The turbine nozzle 26 changes the flow direction of the combustion gas in a direction inclined in the circumferential direction and the radial direction of the radial turbine 30 by a plurality of blades arranged at intervals in the circumferential direction.

The radial turbine 30 is an impeller including a boss 301, a back plate 302 provided in a flange shape at a base end of the boss 301, and a plurality of vanes 303 extending from the boss 301 to the back plate 302 and arranged at intervals in a circumferential direction. The combustion gas is introduced into the radial turbine 30 from the combustor 24 through the turbine nozzle 26. The combustion gas introduced into the radial turbine 30 performs work to rotate the radial turbine 30. The rotational force of the radial turbine 30 is transmitted to the compressor 14 through the shaft 16, and the compressor 14 is rotationally driven.

The gas exhaust member 32 is a cylindrical member. One end part of the gas exhaust member 32 in the axial direction partially surrounds the radial turbine 30. An exhaust port 321 is formed in another end part of the gas exhaust member 32 in the axial direction. The combustion gas that has passed through the radial turbine 30 is discharged an exhaust gas to the exterior from the exhaust port 321 of the combustor 24.

Figure 2:
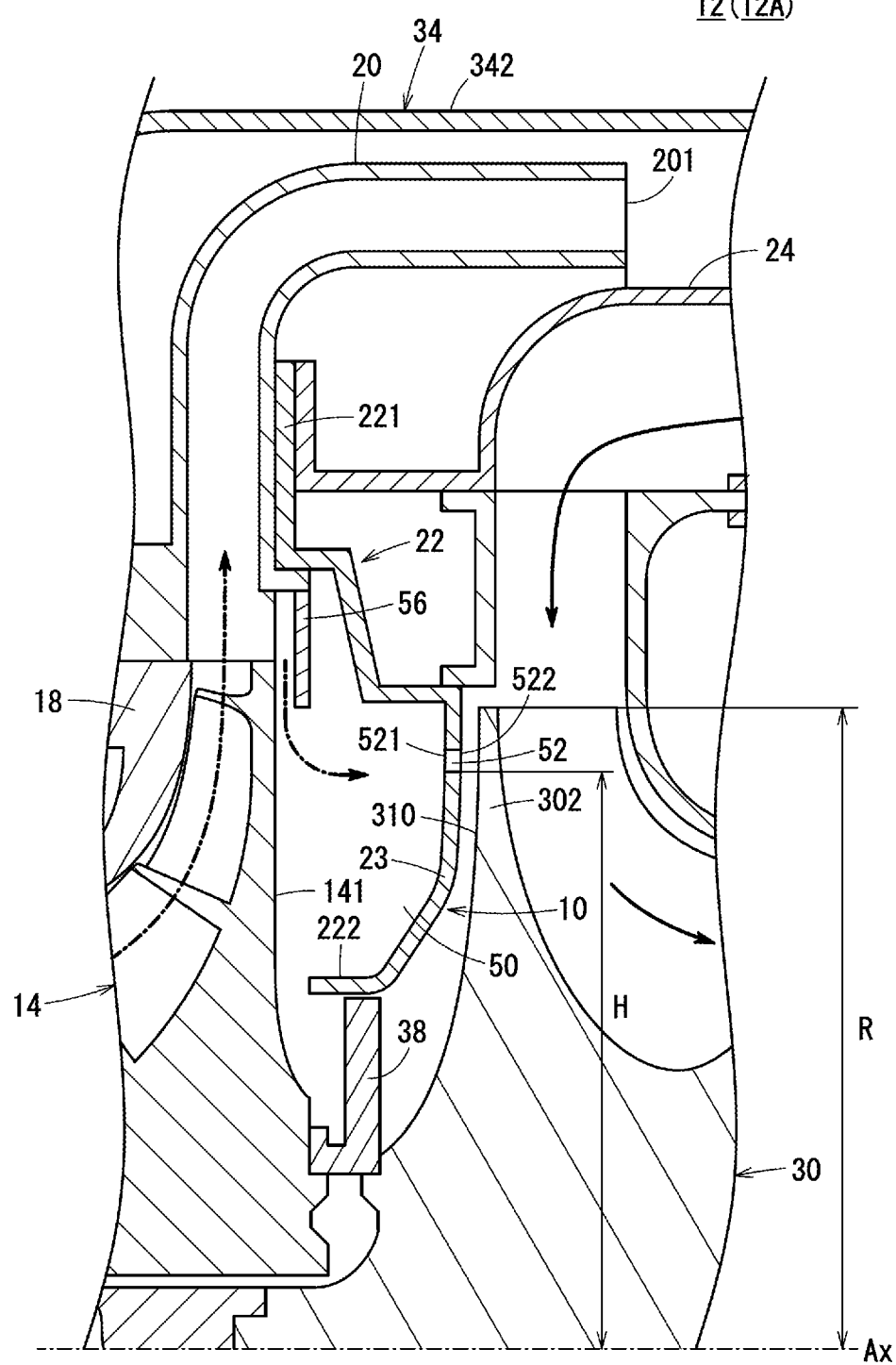
FIG. 2 is a partially enlarged view of FIG. 1, showing the cooling structure for the radial turbine and its surrounding vicinity.

As shown in FIG. 2, the cooling structure 10 for the radial turbine 30 includes the partition wall 23 and a plurality of through holes 52 (one of which is shown) formed in the partition wall 23. As described above, the partition wall 23 is a part of the partition plate 22 and is disposed between the compressor 14 and the radial turbine 30. The partition wall 23 separates a region where the compressor 14 is disposed and a region where the radial turbine 30 is disposed.

An annular air chamber 50 is formed between the compressor 14 and the partition plate 22, and surrounds the rotation axis Ax. A ring plate 56 is disposed between the compressor 14 and the diffuser 20. The inner circumferential portion of the ring plate 56 faces the outer circumferential portion of the compressor 14 at the rear surface 141. A portion of the air compressed by the compressor 14 is introduced into the air chamber 50 through an annular clearance formed between the inner circumferential portion of the ring plate 56 and the outer circumferential portion of the compressor 14.

The through holes 52 supply a part of the air compressed by the compressor 14 to the rear surface 310 of the radial turbine 30 as cooling air. The through holes 52 are each formed in the partition wall 23 at a position facing the outer circumferential portion of the radial turbine 30. Specifically, each of the through holes 52 is provided at a position where a height H from the rotation axis Ax in the radial direction of the radial turbine 30 is 80% to 100% of a radius R of the radial turbine 30. The height H of each of the through holes 52 is a distance from a portion of the through hole 52 closest to the rotation axis Ax (a portion on the most inward in the radial direction of the radial turbine 30), to the rotation axis Ax. The through holes 52 are provided radially inward of the outer circumferential surface of the radial turbine 30 (the outer circumferential surface of the back plate 302). The through holes 52 each have an inlet 521 and an outlet 522.

The inlet 521 faces the rear surface 141 of the compressor 14. The outlet 522 faces the rear surface 310 of the radial turbine 30.

Figure 3:
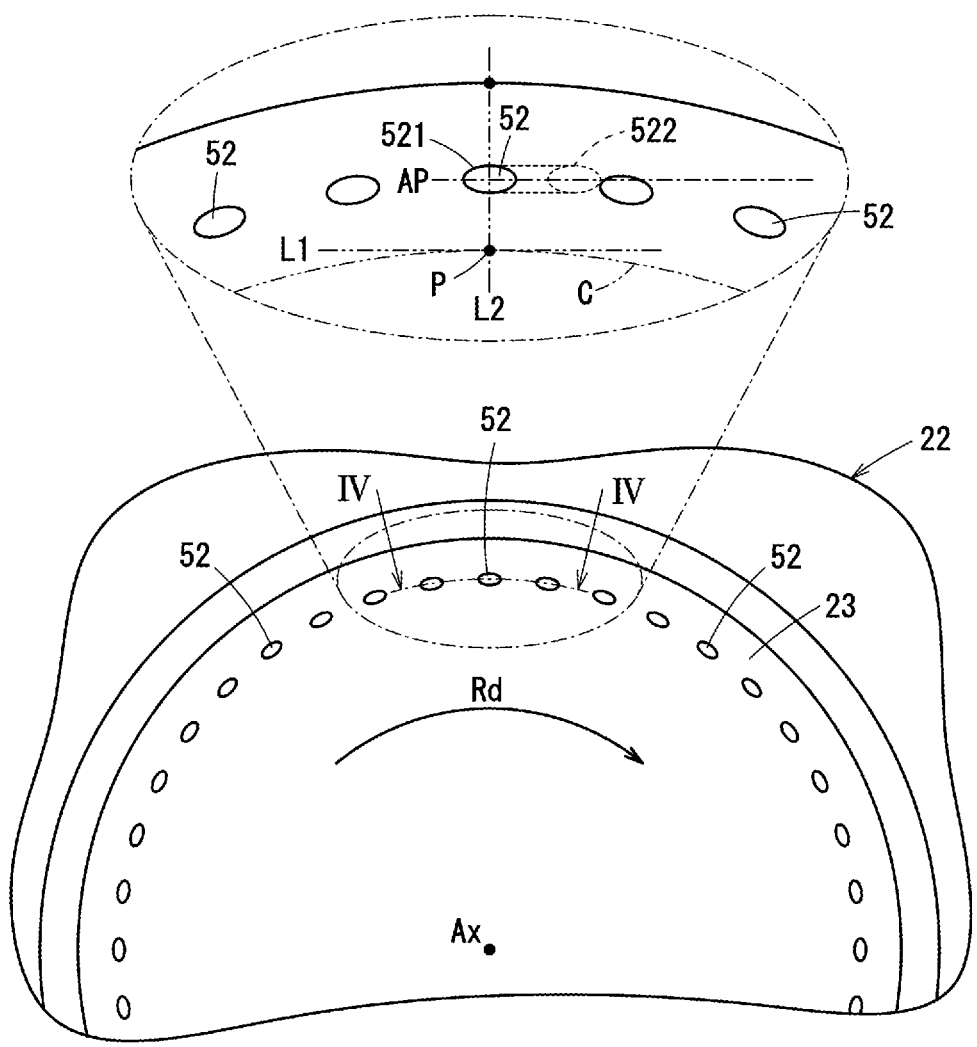
FIG. 3 is a view of a partition wall viewed from a rear side.

As shown in FIG. 3, the plurality of through holes 52 are provided at intervals in the circumferential direction of the radial turbine 30. The plurality of through holes 52 are arranged so as to surround the rotation axis Ax of the radial turbine 30. The plurality of through holes 52 are provided at equal intervals. The plurality of through holes 52 may be provided at unequal intervals. Parameters such as the interval, the number, the position, and the size of the through holes 52 can be appropriately changed within a range not departing from conditions described later.

When viewed in the axial direction of the radial turbine 30, each of the through holes 52 is formed substantially parallel to a tangent line L1 of an imaginary circle C in the circumferential direction of the radial turbine 30 (the imaginary circle C having the center on the axis of on the radial turbine 30). Specifically, a straight line passing through the center of the inlet 521 and the center of the outlet 522 of the through hole 52 is defined as an axis AP of the through hole 52. The intersection of an imaginary straight line L2 passing through the center of the inlet 521 of the through hole 52 along the radial direction of the radial turbine 30 and the imaginary circle C is defined as an intersection P. When viewed in the axial direction of the radial turbine 30, the axis AP of the through hole 52 is substantially parallel to the tangent line L1 passing through the intersection P. When viewed in the axial direction of the radial turbine 30, the axis AP of the through hole 52 may be slightly inclined with respect to the tangent line L1, in a rotational direction Rd of the radial turbine 30, radially outward or radially inward of the radial turbine 30.

Figure 4:
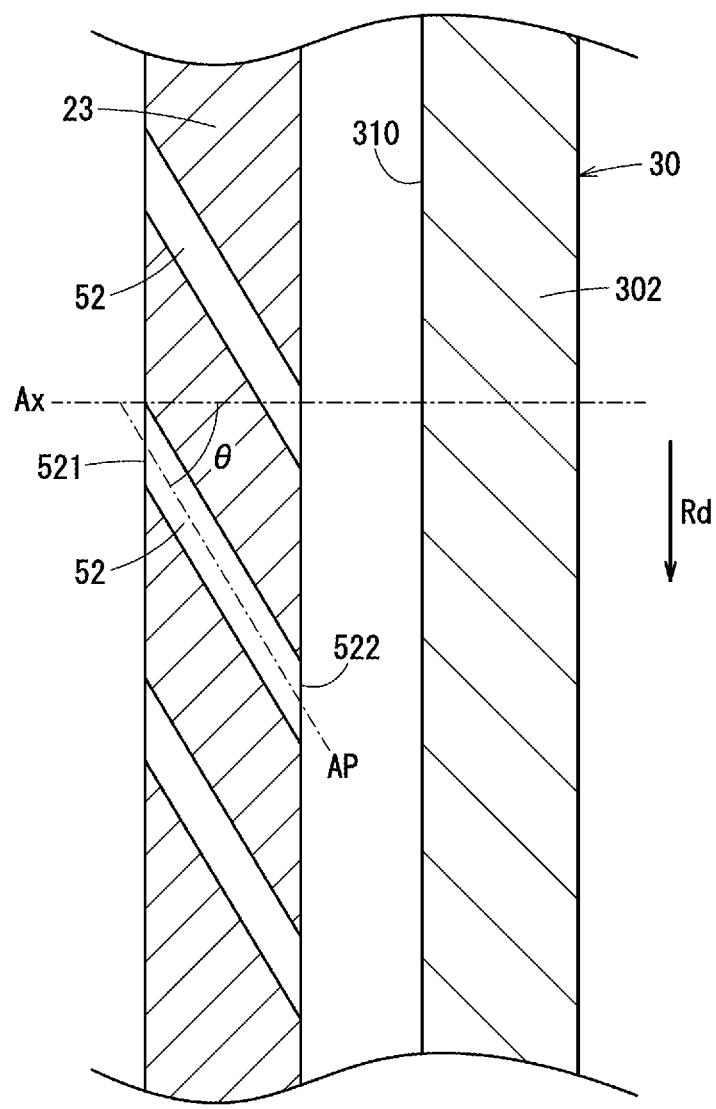
FIG. 4 is a cross-sectional view taken along line IV-IV of FIG. 3.

FIG. 4 is a cross-sectional view of the partition wall 23 at a location where the plurality of through holes 52 are provided, taken along the circumferential direction of the radial turbine 30. That is, FIG. 4 shows a state in which the plurality of through holes 52 arranged at intervals in the circumferential direction of the radial turbine 30 are developed on a plane. As shown in FIG. 4, each of the through holes 52 is inclined in the rotational direction Rd of the radial turbine 30, with respect to the rotation axis Ax of the radial turbine 30. For this reason, each of the outlets 522 of the through holes 52 is provided at a position deviated in the rotational direction Rd of the radial turbine 30 with respect to each of the inlets 521 of the through holes 52. An inclination angle θ of the through hole 52 with respect to the rotation axis Ax is set in the range of 40° to 80°. The inclination angle θ is more preferably set to 45° to 70°. The inclination angle θ of the through hole 52 is specifically an inclination angle of the axis AP of the through hole 52 with respect to the rotation axis Ax of the radial turbine 30.

The reason why the inclination angle θ of the through hole 52 with respect to the rotation axis Ax is set in the range of 40° to 80° is as follows.

In principle, when the through hole 52 is inclined in the rotational direction Rd of the radial turbine 30, a relative velocity Vrel between the velocity of the cooling air blown out from the through hole 52 and the rotational velocity of the radial turbine 30 is smaller than when the through hole 52 is parallel to the axial direction of the radial turbine 30. The rotational velocity of the radial turbine 30 is a moving velocity of the radial turbine 30 at the location where the cooling air collides.

It is known that a following equation (1) holds for the total temperature of compressible fluid.

$$Tt/T = 1 + \{(\gamma - 1)/2\}M^2 \quad (1)$$

Tt: Total temperature of the fluid
T: Temperature of the fluid (static temperature)
γ: Heat capacity ratio
M: Mach number Next, the relationship between the cooling air and the radial turbine 30 is applied to the equation (1). When relative Mach number of the cooling air to the rotational speed of the radial turbine 30 is Mrel, relative total temperature of the cooling air to the radial turbine 30 is Ttrel, and static temperature of the cooling air is Ts, a following equation (2) is established. The relative Mach number Mrel of the cooling air blown out from the through hole 52 is proportional to the relative velocity Vrel of the cooling air. That is, by inclining the through hole 52 in the rotational direction Rd of the radial turbine 30, the relative total temperature of the cooling air with respect to the radial turbine 30 can be theoretically reduced by the following equation (2).

$$Ttrel/Ts = 1 + \{(\gamma - 1)/2\}Mrel^2 \quad (2)$$

Figure 5:
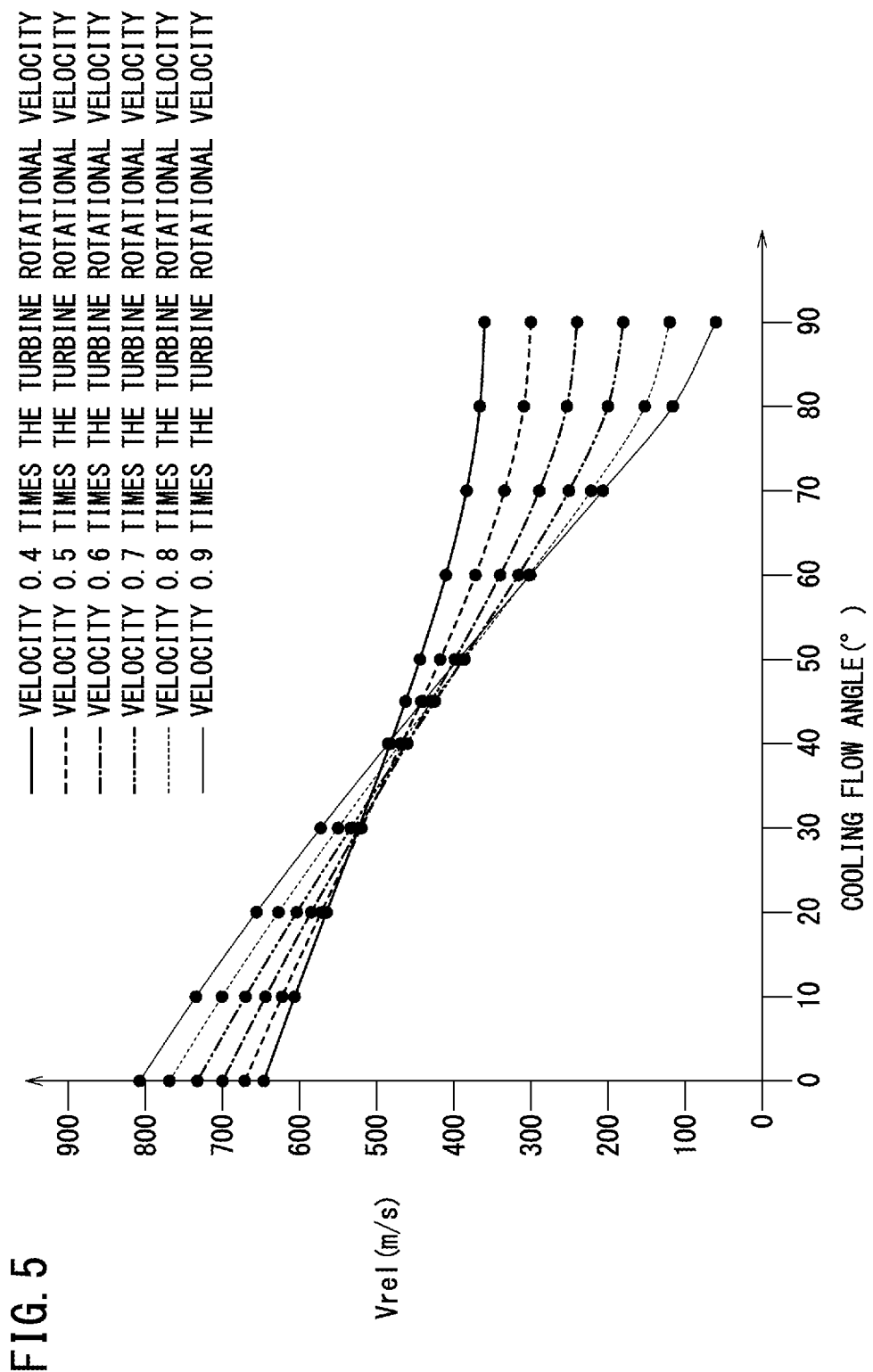
FIG. 5 is a graph showing simulation results as to the relationship between the relative velocity of cooling air and a cooling flow angle, for each velocity of the cooling air.
Figure 6:
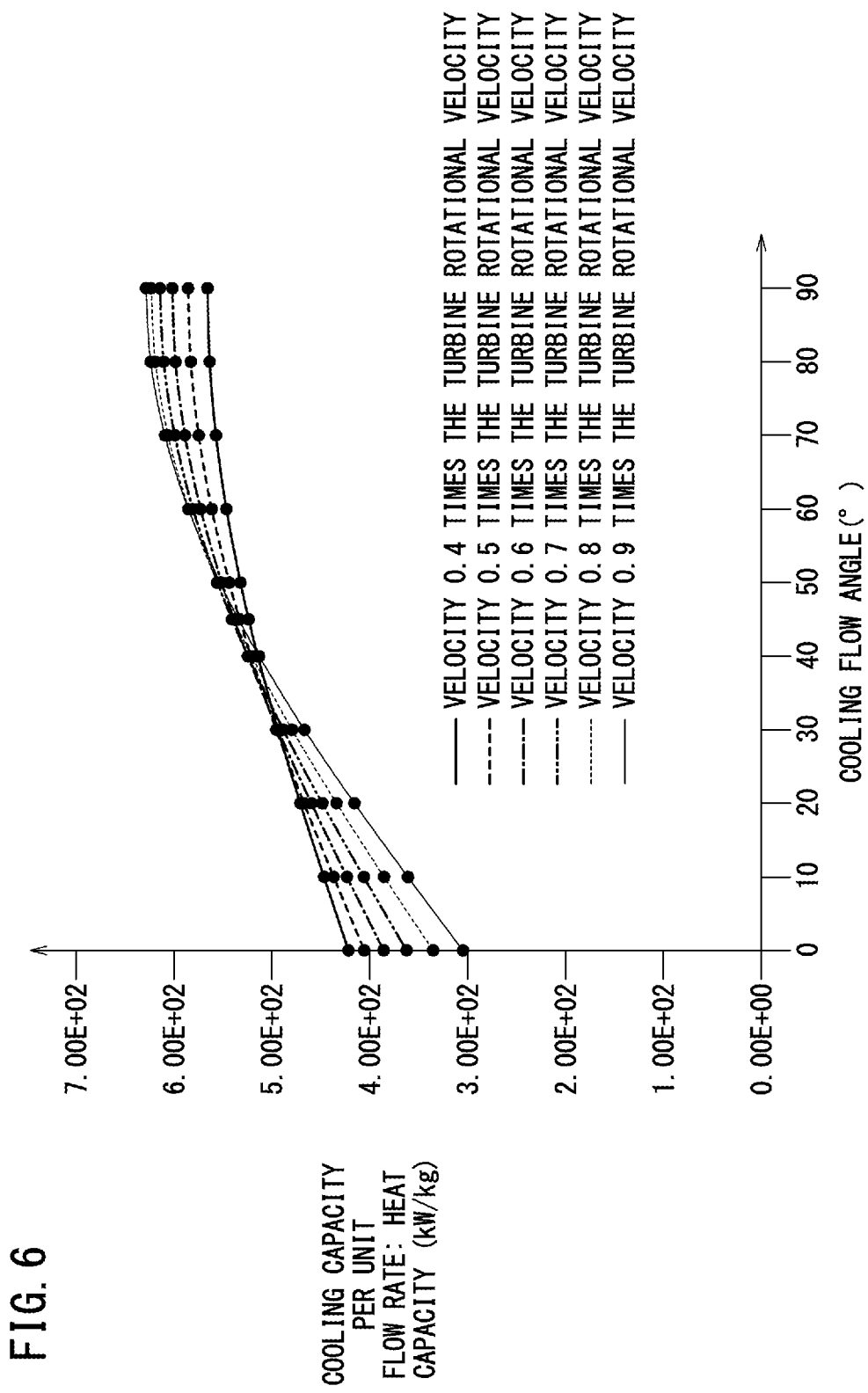
FIG. 6 is a graph showing simulation results as to the relationship between cooling capacity per unit flow rate and the cooling flow angle, for each velocity of cooling air.
Figure 7:
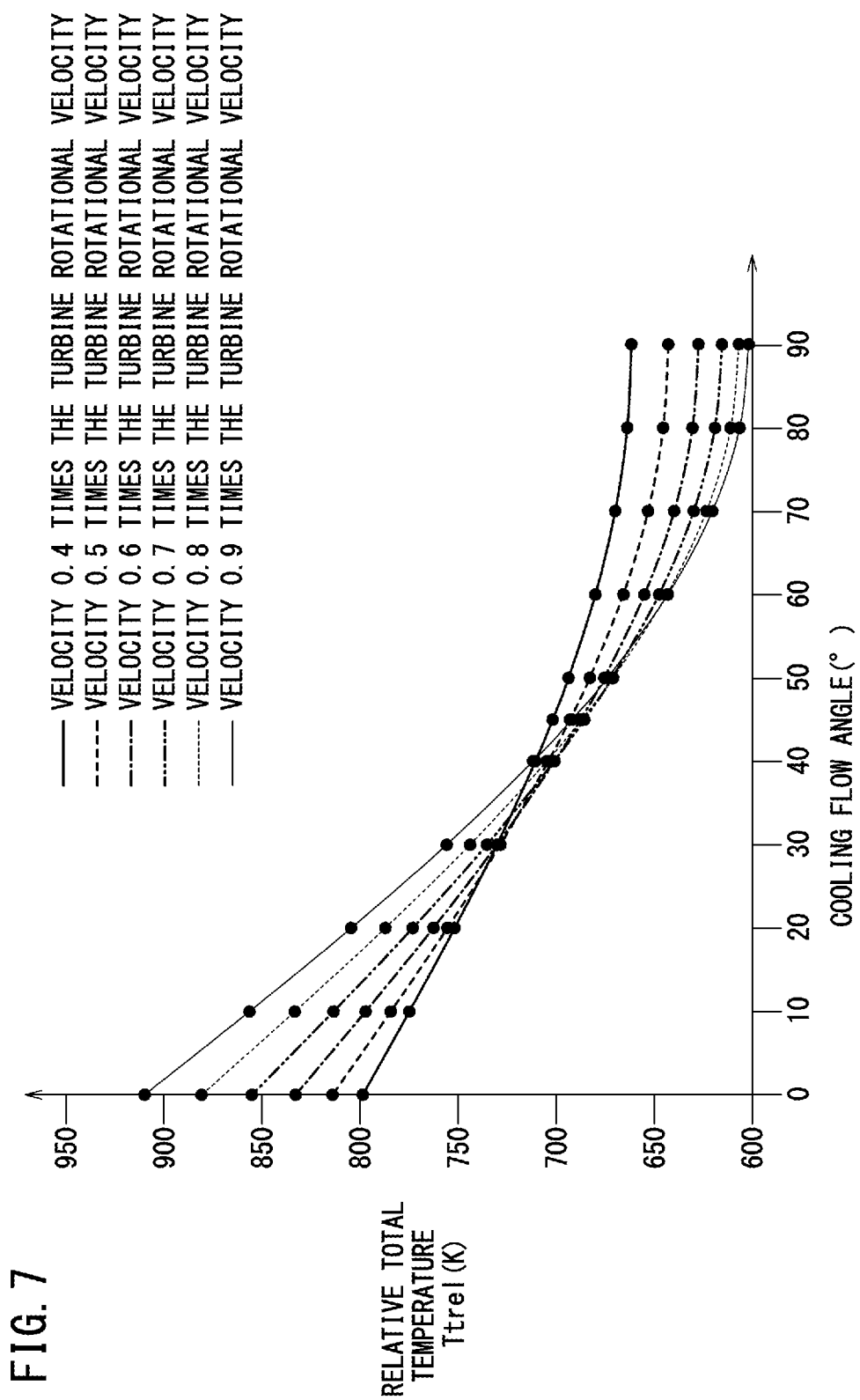
FIG. 7 is a graph showing simulation results as to the relationship between relative total temperature of cooling air for the radial turbine and the cooling flow angle, for each velocity of the cooling air.

In each of FIGS. 5 to 7, simulation results are shown for each cooling air velocity. The "cooling air velocity (velocity of the cooling air)" means the velocity of the cooling air in the axial direction of the through hole 52. In FIGS. 5 to 7, the expression a "velocity 0.4 times the turbine rotational velocity" means that the velocity of the cooling air is 0.4 times the rotational velocity of the radial turbine 30, and the same applies to other factors.

FIG. 5 is a graph showing the simulation results of the relationship between the relative velocity Vrel of the cooling air and the cooling flow angle (the above-mentioned inclination angle θ) for each cooling air velocity. As shown in FIG. 5, the relative velocity Vrel of the cooling air decreases monotonously with respect to the cooling flow angle. The relative velocity Vrel of the cooling air varies depending on the velocity of the cooling air, but it converges once at about 40°. The relative velocity Vrel tends to vary again when the cooling flow angle is more than 40°, but the decrease in the relative velocity Vrel converges (the slope becomes gentle) at the cooling flow angle of 80°.

FIG. 6 is a graph showing simulation results as to the relationship between cooling capacity per unit flow rate and the cooling flow angle, for each velocity of cooling air. As shown in FIG. 6, the cooling capacity per unit flow rate varies depending on the velocity of the cooling air, but it converges once at about 40°. The cooling capacity tends to vary again when the cooling flow angle is more than 40°, but at least a certain level of cooling capacity can be obtained regardless of the cooling air velocity. When the cooling flow angle is 40° or more, the cooling capacity increases further, and at 80° the cooling capacity practically reaches an upper limit. The upper limit of the cooling capacity of 80° is considered to be close to the limit from the viewpoint of boring of the through hole 52.

FIG. 7 is a graph showing simulation results as to the relationship between relative total temperature of cooling air for the radial turbine 30 and the cooling flow angle, for each velocity of the cooling air, in the case where the temperature of cooling air supplied to the radial turbine 30 is at 600K. As shown in FIG. 7, the relative total temperature of the cooling air varies depending on the velocity of the cooling air, but once converges at about 40°. The relative total temperature of the cooling air decreases further when the cooling flow angle is 40° or more. At cooling flow angles of 80° or more, there is little change in the relative total temperature of the cooling air.

From FIGS. 5 to 7, it is understood that the relative total temperature of the cooling air with respect to the radial turbine 30 can be effectively reduced by setting the inclination angle θ of the through hole 52 with respect to the rotation axis Ax in the range of 40° to 80°.

The cooling structure 10 of the radial turbine 30 shown in FIG. 2 operates as follows.

When the compressor 14 and the radial turbine 30 are rotating, a part of the air compressed by the compressor 14 is introduced into the air chamber 50 between the compressor 14 and the partition wall 23. The compressed air introduced into the air chamber 50 is supplied to the radial turbine 30 as cooling air through the through holes 52. The outlets 522 of the through holes 52 face the rear surface 310 of the radial turbine 30 at a position of the outer circumferential portion of the radial turbine 30. Therefore, the outer circumferential portion of the radial turbine 30 is cooled by the cooling air blown out from the through holes 52.

According to the present embodiment, the following advantageous effects are obtained.

As shown in FIG. 4, since the through hole 52 for blowing out the cooling air toward the rear surface 310 of the radial turbine 30 is inclined in the rotational direction Rd of the radial turbine 30 at an angle of 40° or more with respect to the rotation axis Ax of the radial turbine 30. Thus, the relative velocity of the cooling air with respect to the radial turbine 30 during rotation can be reduced. In accordance with this feature, the relative total temperature of the cooling air with respect to the radial turbine 30 can be reduced. Accordingly, it is possible to secure the cooling capacity of the cooling structure 10 without providing a large notch in the outer circumferential portion of the radial turbine 30 or providing a structure of flow path for cooling in the back plate 302 of the radial turbine 30. That is, it is possible to cool the radial turbine 30 effectively. Also, the through hole 52 is inclined in the rotational direction Rd of the radial turbine 30 at an angle of 80° or less with respect to the rotation axis Ax of the radial turbine 30. Thus, the through hole 52 can be formed by boring while ensuring the cooling capacity.

It is not necessary to provide a notch or a scallop portion in the outer circumferential portion of the radial turbine 30, or it is sufficient to provide a small notch even when a notch is otherwise provided. Thus, a desired thrust force in the axial direction can be applied to the radial turbine 30. Therefore, in FIG. 1, the axial thrust force acting on the compressor 14 and the axial thrust force acting on the radial turbine 30 are balanced, whereby the thrust force acting on the shaft 16 can be reduced. This can reduce the load on the bearings supporting the shaft 16.

Compressed air flows into the space between the partition wall 23 and the back plate 302 of the radial turbine 30 through the clearance between the inner circumferential portion 222 of the partition plate 22 and the seal ring 38 (see FIG. 2). Thus, windage loss occurs between the partition wall 23 and the back plate 302 of the radial turbine 30. The cooling air supplied obliquely toward the back plate 302 of the radial turbine 30 has a velocity component in the rotational direction Rd of the radial turbine 30. Thus, the velocity component in the circumferential direction of the air between the partition wall 23 and the back plate 302 of the radial turbine 30 is increased. As a result, the windage loss generated between the partition wall 23 and the back plate 302 of the radial turbine 30 can be reduced.

As shown in FIG. 3, when viewed in the axial direction of the radial turbine 30, the through hole 52 is formed substantially parallel to the tangent line L1 of the imaginary circle C in the circumferential direction of the radial turbine 30. In accordance with such a configuration, the relative velocity of the cooling air can further be reduced, and the relative total temperature of the cooling air with respect to the radial turbine 30 can further be reduced.

As shown in FIG. 2, the height H of the through hole 52 from the rotation axis Ax in the radial direction of the radial turbine 30 is set at the position of 80% to 100% of the radius R of the radial turbine 30. The portion of the radial turbine 30 positioned at 80% to 100% of the radius R (the outer circumferential portion of the radial turbine 30) is a portion of the radial turbine 30 that is first exposed to the combustion gas and has a small heat capacity because of its small wall thickness. Therefore, the temperature of the outer circumferential portion of the radial turbine 30 is likely to increase. Therefore, the durability of the outer circumferential portion of the radial turbine 30 is likely to be lowered due to the influence of thermal stress. Since the cooling air is supplied to the outer circumferential portion of the radial turbine 30, the temperature difference between the central portion and the outer circumferential portion of the radial turbine 30 is reduced, and the deterioration of durability due to thermal stress can be suppressed.

As shown in FIG. 1, the rotating machine 12 is the gas turbine 12A including the combustor 24 configured to burn the air compressed by the compressor 14 and mixed with the fuel. In accordance with such a configuration, it is possible to effectively cool the radial turbine 30 of the gas turbine 12A.

As shown in FIG. 3, the plurality of through holes 52 are provided at intervals in the circumferential direction of the radial turbine 30. The radial turbine 30 can be cooled more effectively by the cooling air supplied from the plurality of through holes 52.

In FIG. 2, compressed air is introduced into the air chamber 50 of the partition plate 22 from the outlet of the compressor 14, but the route of introducing compressed air is not limited to this configuration. Compressed air may be drawn into the air chamber 50 of the partition plate 22 from any point in the air flow path between the compressor 14 and the combustor 24.

Figure 8:
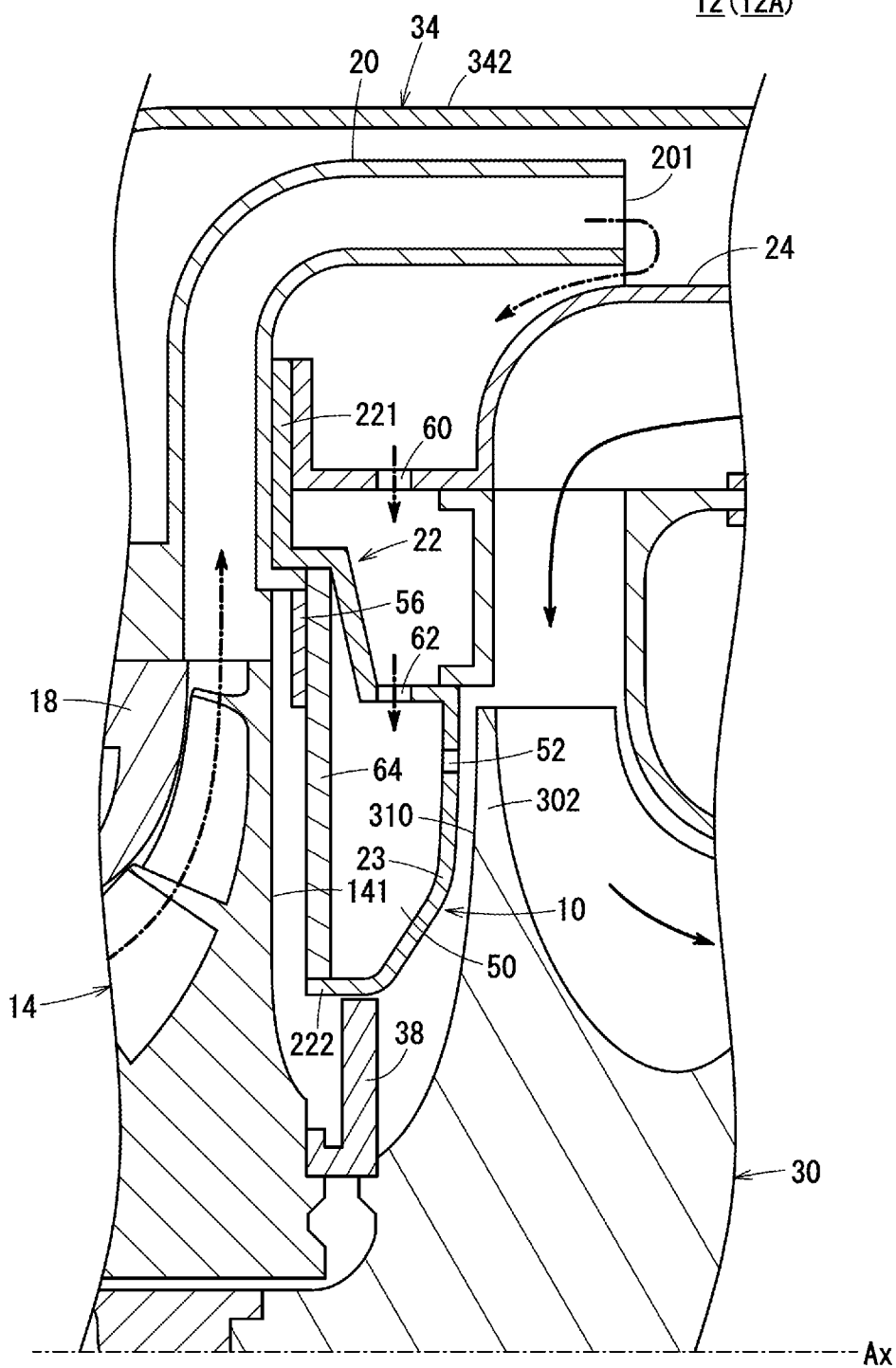
FIG. 8 is a view showing a cooling structure of the radial turbine according to another embodiment, and its surrounding vicinity.

FIG. 8 shows another example of the route for introducing compressed air into the air chamber 50 of the partition plate 22. In FIG. 8, vent holes 60 and 62 are provided in a wall portion on one end side of the combustor 24 (a side closer to the diffuser 20) and a wall portion on a radially outward side of the through hole 52 in the partition plate 22, respectively. The compressed air flowing out of the outlet 201 of the diffuser 20 flows into the air chamber 50 through the vent holes 60 and 62. A ring-shaped partition wall 64 is fixed to the partition plate 22 so as to close the air chamber 50. By providing the partition wall 64, the route of compressed air from the outlet of the compressor 14 to the air chamber 50 is blocked. In accordance with the configuration of FIG. 8, it is also possible to introduce compressed air into the air chamber 50 on the back side of the partition wall 23.

Figure 9:
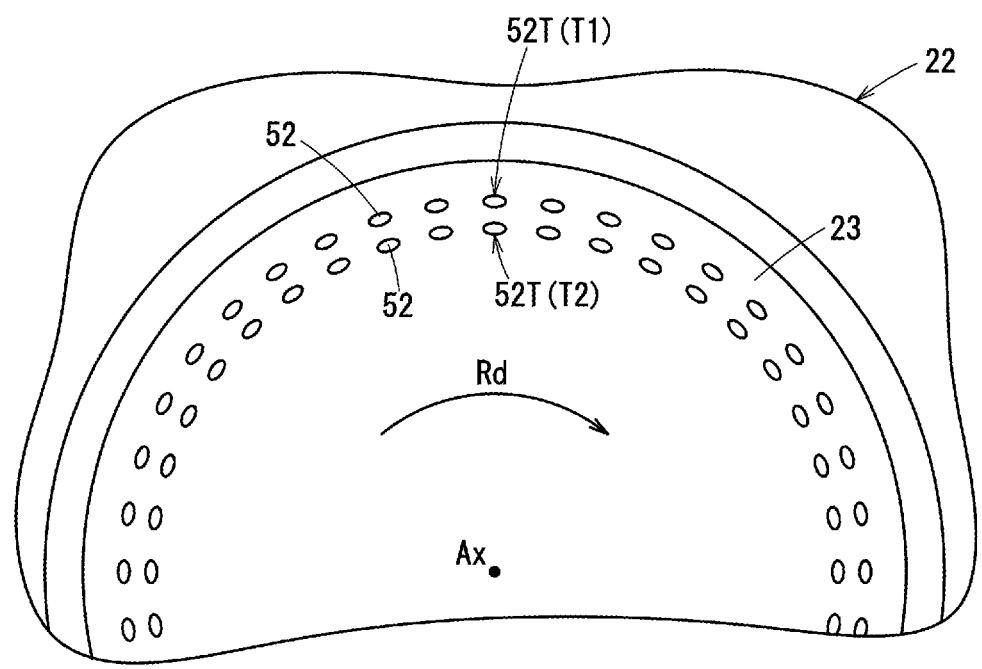
FIG. 9 is a view of a partition wall viewed from the rear side, showing another aspect of the arrangement of through holes.

In the partition wall 23 shown in FIG. 9, hole rows 52T are formed by a plurality of through holes 52 formed at intervals in the circumferential direction. The plurality of hole rows 52T are arranged in a concentric manner around the rotation axis Ax. Specifically, a first hole row T1 and a second hole row T2 arranged inside the first hole row T1 are formed in the partition wall 23. It is possible to cool the radial turbine 30 more effectively by the plurality of hole rows 52T arranged in a concentric manner. Three or more hole rows 52T may be provided in a concentric manner. Between the hole rows 52T that are adjacent to each other in the radial direction, the positions of the through holes 52 may be shifted in the circumferential direction.

With respect to the above disclosure, the following Supplementary Notes are disclosed.

Supplementary Note 1

The cooling structure (10) for the radial turbine in the rotating machine (12) is provided. The rotating machine includes the compressor (14) configured to compress air and the radial turbine (30) rotationally driven by the combustion gas, and the cooling structure includes the partition wall (23) disposed between the compressor and the radial turbine and separating the region where the compressor is disposed and the region where the radial turbine is disposed, and the through hole (52) provided in the partition wall and through which a part of the air compressed by the compressor is supplied to the rear surface (310) of the radial turbine as the cooling air, wherein the through hole is inclined in the rotational direction of the radial turbine in the range of 40° to 80° with respect to the rotation axis of the radial turbine. According to such a configuration, the through hole for blowing out the cooling air toward the rear surface of the radial turbine is inclined in the rotational direction of the radial turbine at an angle of 40° or more with respect to the rotation axis of the radial turbine. Thus, the relative velocity of the cooling air with respect to the radial turbine during rotation can be reduced. In accordance with this feature, the relative total temperature of the cooling air with respect to the radial turbine can be reduced. Accordingly, it is possible to secure the cooling capacity of the cooling structure without providing a large notch in the outer circumferential portion of the radial turbine or providing a structure of flow path for cooling in the back plate of the radial turbine. That is, it is possible to cool the radial turbine effectively. The through hole is inclined in the rotational direction of the radial turbine at an angle of 80° or less with respect to the rotation axis of the radial turbine. Thus, the through hole can be formed by boring while ensuring the cooling capacity.

Supplementary Note 2

In the cooling structure of the radial turbine described in Supplementary Note 1, the through hole may be formed substantially parallel to the tangent line (L1) of the imaginary circle (C) in the circumferential direction of the radial turbine when viewed from the axial direction of the radial turbine. In accordance with such a configuration, the relative velocity of the cooling air can further be reduced, and the relative total temperature of the cooling air with respect to the radial turbine can further be reduced.

Supplementary Note 3

In the cooling structure for the radial turbine according to Supplementary Note 1 or 2, the height (H) of the through hole from the rotation axis in the radial direction of the radial turbine may be set at the position of 80% to 100% of the radius (R) of the radial turbine. The portion of the radial turbine positioned at 80% to 100% of the radius (the outer circumferential portion of the radial turbine) is a portion of the radial turbine that is first exposed to the combustion gas and has a small heat capacity because of its small wall thickness. Therefore, the temperature of the outer circumferential portion of the radial turbine is likely to increase. Therefore, the durability of the outer circumferential portion of the radial turbine is likely to be lowered due to the influence of thermal stress. Since the cooling air is supplied to the outer circumferential portion of the radial turbine, the temperature difference between the central portion and the outer circumferential portion of the radial turbine is reduced, and the deterioration of durability due to thermal stress can be suppressed.

Supplementary Note 4

In the cooling structure for the radial turbine according to Supplementary Note 1 or 2, the rotating machine may be the gas turbine engine including the combustor (24) configured to burn the air compressed by the compressor and mixed with the fuel. In accordance with such a configuration, it is possible to effectively cool the radial turbine of the gas turbine engine.

Supplementary Note 5

In the cooling structure for the radial turbine according to the Supplementary Note 1 or 2, the through hole may include the plurality of the through holes that are provided at intervals in the circumferential direction of the radial turbine. In accordance with such a configuration, it is possible to cool the radial turbine more effectively by the cooling air supplied from the plurality of through holes.

Supplementary Note 6

In the cooling structure for the radial turbine according to Supplementary Note 5, the plurality of through holes may constitute the hole row (52T), and the hole row may include the plurality of the hole rows that are arranged in the concentric manner around the rotation axis. It is possible to cool the radial turbine more effectively by the plurality of hole rows arranged in the concentric manner.

It should be noted that the present invention is not limited to the disclosure described above, and various additional or alternative configurations could be adopted therein without departing from the essence and gist of the present invention.

The invention claimed is:

1. A cooling structure for a radial turbine in a rotating machine, the rotating machine including a compressor configured to compress air and the radial turbine rotationally driven by combustion gas, the cooling structure comprising:
    a partition wall disposed between the compressor and the radial turbine and separating a region where the compressor is disposed and a region where the radial turbine is disposed; and
    a through hole provided in the partition wall and through which a part of the air compressed by the compressor is supplied to a rear surface of the radial turbine as a cooling air,
    wherein the through hole is inclined in a rotational direction of the radial turbine in a range of 40° to 80° with respect to a rotation axis of the radial turbine.

2. The cooling structure for the radial turbine according to claim 1, wherein an axis of the through hole that passes through a center of an inlet of the through hole and a center of an outlet of the through hole is formed substantially parallel to a tangent line of an imaginary circle in a circumferential direction of the radial turbine when viewed from an axial direction of the radial turbine.

3. The cooling structure for the radial turbine according to claim 1, wherein a height of the through hole from the rotation axis in a radial direction of the radial turbine is set at a position of 80% to 100% of a radius of the radial turbine.

4. The cooling structure for the radial turbine according to claim 1, wherein the rotating machine is a gas turbine engine including a combustor configured to burn the air compressed by the compressor and mixed with fuel.

5. The cooling structure for the radial turbine according to claim 1, wherein the through hole comprises a plurality of the through holes that are provided at intervals in a circumferential direction of the radial turbine.

6. The cooling structure for the radial turbine according to claim 5, wherein the plurality of through holes constitute a hole row, and the hole row comprises a plurality of the hole rows that are arranged in a concentric manner around the rotation axis.

* * * * *